(12) United States Patent
Blankenship et al.

(10) Patent No.: US 6,180,920 B1
(45) Date of Patent: Jan. 30, 2001

(54) ELECTRODE AND METHOD OF MAKING SAME

(75) Inventors: George D. Blankenship, Chardon; Edward A. Enyedy, Eastlake, both of OH (US)

(73) Assignee: Lincoln Global, Inc., Monterey Park, CA (US)

(*) Notice: Under 35 U.S.C. 154(b), the term of this patent shall be extended for 0 days.

(21) Appl. No.: 09/366,762

(22) Filed: Aug. 4, 1999

Related U.S. Application Data

(63) Continuation-in-part of application No. 09/024,392, filed on Feb. 17, 1998.

(51) Int. Cl.⁷ .................................................... B23K 35/02
(52) U.S. Cl. ............................... 219/145.1; 219/145.22; 219/145.23; 219/145.31; 219/145.32
(58) Field of Search .................... 219/145.1, 145.22, 219/145.23, 145.31, 145.32; 148/22, 23, 24

(56) References Cited

U.S. PATENT DOCUMENTS

| | | | |
|---|---|---|---|
| 1,354,664 | * | 10/1920 | Knoll et al. . |
| 1,835,899 | * | 12/1931 | Rode . |
| 1,940,573 | * | 12/1933 | Austin ........................................ 219/8 |
| 3,620,830 | * | 11/1971 | Kramer .................................. 117/204 |
| 3,691,340 | * | 9/1972 | Landis et al. ......................... 219/146 |
| 3,843,867 | * | 10/1974 | Helton et al. ......................... 219/137 |
| 4,072,845 | * | 2/1978 | Buckingham et al. ............ 219/146.3 |
| 4,864,093 | * | 9/1989 | Henderson et al. .................... 219/70 |

FOREIGN PATENT DOCUMENTS

92/03251 * 3/1992 (WO) ............................ B23K/35/04

* cited by examiner

*Primary Examiner*—Patrick Ryan
*Assistant Examiner*—M. Alexandra Elve
(74) *Attorney, Agent, or Firm*—Vickers, Daniels & Young

(57) ABSTRACT

A welding wire for use in electric arc welding and method of making same, wherein the wire has an effective outer diameter and comprises a length of solid metal formed into a series of distinct segments each having a selected volume and having an indented and non-indented region with the cross sectional area of the solid metal at said non-indented region being greater than the cross sectional area of the solid metal at the indented region.

27 Claims, 3 Drawing Sheets

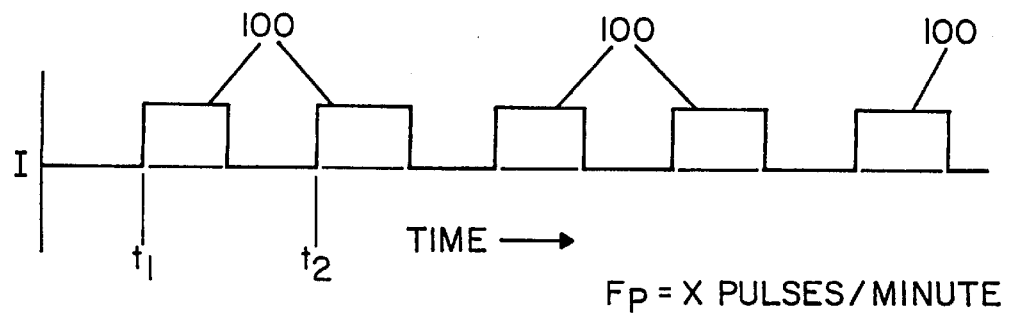
FIG. 5
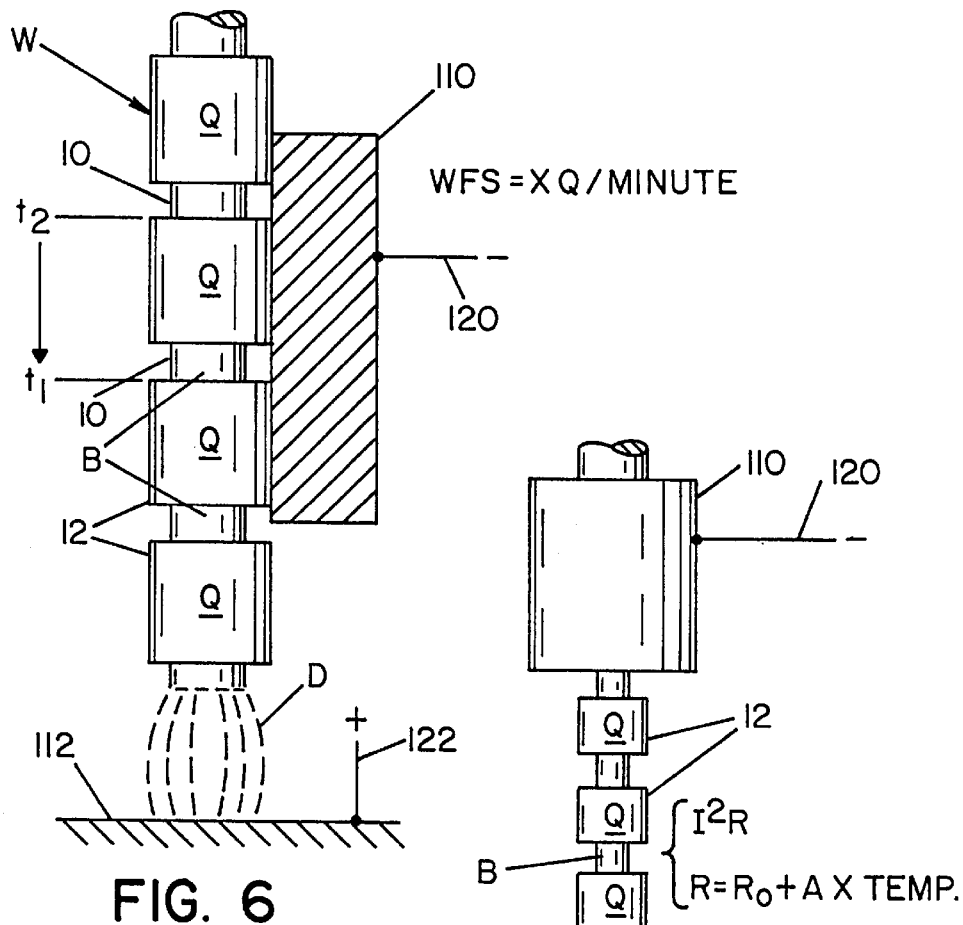
FIG. 6
FIG. 7

ELECTRODE AND METHOD OF MAKING SAME

This United States patent application is a continuation-in-part of U.S. patent application Ser. No. 024,392 filed Feb. 17, 1998.

The present invention relates to the art of electric arc welding of the type where a welding wire is directed toward a workpiece and an electrical current is passed through the welding wire to the workpiece to create an arc welding process melting the end of the advancing wire and depositing the melted metal onto the workpiece and more particularly to an improved welding wire for use in this arc welding process and the method of making this improved welding wire.

INCORPORATION BY REFERENCE

U.S. patent application Ser. No. 024,392 filed Feb. 17, 1998 is incorporated by reference herein to provide information on solid metal welding wire which has distinct quantized segments that facilitate superior droplet transfer.

BACKGROUND OF INVENTION

Electric arc welding of the type to which the present invention is directed involves the use of a welding wire normally stored upon a spool or reel, which wire is fed from the supply reel toward a workpiece through a tubular connector so that current can be directed through the connector to the advancing welding wire and through the welding wire to the workpiece. The electric current heats the advancing welding wire by $I^2R$ heating so that the end of the welding wire is melted and deposited onto the workpiece by transfer through the arc or by other electrical and mechanical phenomenon. Thus, the advancing wire conducts the welding current which melts the wire for deposition of the molten metal from the end of the wire onto the workpiece. Through the years there have been substantial improvements in the welding wire, which is normally a solid wire having a predetermined diameter and a surface lubricant so the wire can be advanced at a controlled feed speed for melting and depositing the molten metal onto the workpiece. Shielding gas can be used around the advancing welding wire. A solid wire provides superior arc welding properties; however, it is often necessary to provide the welding wire with flux and alloying metal ingredients to tailor the molten metal deposition to the desired metallurgical demands of the welding process. To accomplish these added features, it has become common practice to form the wire as a steel sheath surrounding a center core formed from fluxing ingredients and/or alloying powder. Thus, there are many cored welding wires. By using a cored wire concept, the flux can be evenly distributed along the length of the advancing welding wire. When producing the metal sheath from a somewhat standard steel, the core can include alloying powder. These metal cored electrodes employ the powdered metal in the core to tailor the deposited metal for a given welding process. There is a substantial advantage in some welding processes to use the flux cored or metal cored wire. Indeed, there are instances when a combination flux and alloy powder are used in the core of the wire. The advantages of these cored wires or electrodes for arc welding wire are somewhat offset by the fact that a solid metal wire normally produces superior arc welding. The metal is at the center of the arc and in a sheath surrounding the arc, as in a flux cored or metal cored wire. Both a solid metal wire and a metal cored wire have a substantially constant resistance per length of wire, which resistance controls the arc welding process especially in constant voltage arc welding procedures. In some arc welding processes, it is desirable to have an increased resistance per length to optimize the welding process, but such a modification affects the amount of metal being deposited. The solid metal wire and the cored metal wire satisfy the demands of the electric arc welding industry; however, they have disadvantages caused by the constraints of their physical characteristics which in some instances does not allow optimum electrical characteristics of the welding process.

THE INVENTION

The present invention is a solid metal welding wire which has distinct quantized segments that facilitate superior droplet transfer. The segments each have essentially the same volume. This use of a solid welding wire with quantized distinct segments separated by bridging elements has been found to perform well with conventional constant voltage welding sources. The current or heating is controlled by the effective resistance or resistance per length, which resistance is increased by using interconnecting smaller bridging elements between the larger segments thereby varying the cross sectional area of the wire along the longitudinal length of the wire. This type of solid wire has the advantage that it is easily made by simply processing existing solid wire in a manner to produce a series of spaced indentations creating a quantized segment between adjacent indentations along the length of the wire. Such indentations can be done at the manufacturing facility making the solid wire or in a device adjacent to the wire feeder at the welding station, which is often a robotic welding station. By using a solid welding wire having quantized spaced segments along the longitudinal length of the wire, pulsed arc welding can be coordinated so that the pulse frequency and the wire feed rate provide a quantized segment at the time of each current pulse. This coordination stabilizes the pulsed mode transfer so that a single droplet detachment is achieved with each current pulse to optimize the welding characteristics in ways well known in the welding art. The electrode is heated by current passing through the wire. The resistance of the wire has a direct effect on the heating. Thus, by using smaller areas between the quantized segments, the effective resistance or resistance per length is increased and the current is decreased when a constant voltage is applied to the welding process. This adjustment of resistance controls the heating of the advancing welding wire in a manner determined by the area and length of the bridging elements created by the indentations defining the spaced quantized segments. By using the present invention, the resistance per length of wire is higher than with a solid wire with a uniform cross sectional area. This is an advantage at high deposition rates because the heat input into the workpiece per unit weight of wire can be reduced to extend the stable range of the constant voltage process. By reducing the cross sectional area of the metal in the bridging element between the quantized segments, the resistance per length can be modified in a tailored fashion. The shape of the indentations creating the bridging elements between the quantized segments of the solid wire electrode can be in the form in a variety of configurations which causes the cross sectional area to reduce and, thus, increase the resistance of the solid wire between the quantized segments. One form is circular grooves. The solid metal wire can be provided with fluxing, filling and/or alloying agents, such that the agents are carried within the indentations without affecting the outer diameter of the metal wire. Electrical contact is maintained at the outer portions of the quantized segments. By adjusting the relative length of the quantized segments and the length of the groove forming the connecting elements, the desired amount of fluxing or alloying agents can be provided per length of the advancing solid metal welding wire. Such solid wire has the advantages of standard solid wire with the added advantage of a flux cored or metal cored wire. To protect the fluxing, filling or alloying agents in the space created by the indentations forming the bridging elements, another aspect of the invention includes the use of a metal sheath around the metal electrode. This sheath can be steel or copper to enhance electrical conduction from the electrical contact in the welding equipment to the advancing solid metal welding wire. Thus, moisture contamination and physical damage to the fluxing, filling or alloying agents is inhibited. The sheath or jacket can be mechanically wrapped around the wire having spaced quantized segments by using a standard spiral wrapping technique. The sheath or jacket can be placed around the wire and drawn or rolled with the wire, using techniques similar to those employed in conventional cored wired manufacturing techniques. The sheath or jacket can also be provided by a plating technique or a plasma spray technique so long as the sheath or jacket around the quantized segments is electrically conductive. Indeed, such a sheath or jacket can be placed around the quantized segments forming the solid metal welding wire without the use of filling agents merely to enhance the electrical characteristics, or appearance, of the advancing metal wire stored on a spool for use in an automatic or semi-automatic electric arc welding process.

In accordance with the present invention, there is provided a welding wire for use in electric arc welding wherein the welding wire has an effective outer diameter and comprises a length of solid metal formed into a series of distinct quantized segments, each having a selected volume and positioned between at least one indentation. By controlling the cross section area of along the length of the wire, the resistance per length of welding wire can be changed to control the welding process so that a lesser amount of current will be needed to deposit a given amount of molten metal.

In accordance with another aspect of the present invention, the metal wire includes fluxing, filling or alloying agents in the space created by the indentations and a metal sheath is placed about the metal wire to protect the fluxing, filling or alloying agents in the indentations. This sheath is preferably steel or copper and is used to enhance electrical conduction from the electrical contact in the welding equipment to the advancing solid metal welding wire. The sheath or jacket can be placed around the wire and drawn or rolled with the wire, using techniques similar to those employed in conventional cored wired manufacturing techniques. The sheath or jacket can also be provided by a plating technique or a plasma spray technique so long as the sheath or jacket around the quantized segments is electrically conductive. Indeed, such a sheath or jacket can be placed around the quantized segments forming the solid metal welding wire without the use of filling agents merely to enhance the electrical characteristics, or appearance, of the advancing metal wire stored on a spool for use in an automatic or semi-automatic electric arc welding process.

In accordance with another aspect of the present invention, the bridging elements are formed by indentations, such as circular grooves, which indentations may be filled with a fluxing agent, alloying metal powder or other constituents to control the metallurgy and fluxing characteristics of the metal wire while maintaining the advantage of a solid metal arc welding wire.

In accordance with another aspect of the present invention, the quantized distinct metal segments have a maximum cross sectional area essentially defining the effective outer diameter of the solid metal welding wire while the bridging elements of the wire have a maximum cross sectional area that is substantially less than the maximum cross sectional area of the quantized segments.

In accordance with yet another aspect of the present invention, each quantized segment of the wire has generally the same volume of metal, and are positioned generally uniformly along the length of the wire. The indentations are preferably oriented to as to generally symmetrically positioned about the peripheral surface of the wire.

In accordance with a further aspect of the present invention, there is provided a method of producing a solid welding wire for electric arc welding, which method comprises the steps of conveying a solid metal welding wire along a given path to define a series of distinct metal segments each having a selected volume. These quantized metal segments are joined together by bridging elements determined by the shape of the separating indentations. In practice, the indentations are circular grooves between the quantized metal segments of the solid welding wire.

In accordance with still a further aspect of the invention, this method includes the step of depositing granular flux into the indentations or depositing powder alloying metal into the indentations. In this manner, the indentations can control the even distribution of alloying agents and/or fluxing agents along the length of the solid welding wire, without requiring the use of a cored wire concept. The method also contemplates the further implementation of an aspect of the invention wherein a metal sheath of steel or other conductive material is placed around the solid metal welding wire.

By using the invention, the series of distinct quantized metal segments that are joined together by interconnecting bridging elements can have effective resistance of the solid metal welding wire accurately controlled by adjusting the relationship of the segments and bridging elements.

In accordance with another aspect of the present invention there is provided a method of controlling the resistance per length of a solid metal welding wire used for electric arc welding including the steps of providing a solid metal welding wire, forming a series of indentations in the wire at spaced locations whereby the resistance per length at the indentations is greater than the resistance per length of the wire between the indentations and controlling the size of the indentations to control the overall resistance per length of the wire. This method is further modified by including the step of controlling the spaces between the indentations to provide quantized segments of generally equal volume of metal.

The primary object of the present invention is the provision of a solid metal welding wire, which wire has a series of distinct, quantized segments wherein each segment includes a varying cross sectional area.

Another object of the present invention is the provision of a solid metal wire, as defined above, which solid metal wire can be produced from a wire at the manufacturing facility or adjacent the wire feeding device in the welding area.

Still another object of the present invention is the provision of a solid metal wire, as defined above, which enables improved control of the transfer of molten wire to the weld.

Yet another object of the present invention is the provision of a solid metal wire, as defined above, which enables increased heating of the wire as compared to conventional wires.

Yet another object of the present invention is the provision of a solid metal welding wire, as defined above, which wire has improved arc stability and controlled heat input. The wire can greatly facilitate pulse arc welding in a constant voltage welding process.

Still a further object of the present invention is the provision of a solid metal welding wire, as defined above, which wire can be produced to have a controlled resistance per length greater than the resistance per length of a metal wire of the same diameter.

A further object of the present invention is the provision of a solid metal welding wire, as defined above, which wire can be produced to control the resistance of the wire stick out per unit volume of wire directed to the workpiece.

Another object of the present invention is the provision of a solid metal welding wire, which wire has a greater resistance per length than a solid wire of the same diameter. This object is an advantage at very high deposition rates due to a reduced heat input to the workpiece per unit length of wire, thus extending the stable range of a constant voltage process.

Still a further object of the present invention is the provision of a solid metal welding wire, as defined above, which welding wire can have controlled resistance per unit length or controlled resistance of the stick out merely by utilizing a series of indentations defining the distinct quantized segments of the wire.

Another object of the present invention is the provision of a solid metal welding wire, as defined above, which welding wire can be coordinated with a pulse welding process so that a quantized segment of the wire is provided to the arc of the welding process simultaneously with each current pulse.

Still another object of the present invention is the provision of a solid metal welding wire, as defined above, which produces higher deposition rates than convention wires.

Yet another object of the present invention is the provision of a solid metal welding wire, as defined above, which reduces spatter and produces less fumes and soot there forming a cleaner weld than conventional wires.

A further object of the present invention is the provision of a solid metal welding wire, as defined above, which welding wire can be provided with fluxing, filling and/or alloying agents that can be carried with the wire while maintaining the solid metal characteristics of the welding wire. In addition, the wire of the present invention can be provided with an outer metal sheath to hold the fluxing, filling or alloying agents and/or to increase the conductivity to the advancing metal welding wire during the welding process.

Another primary object of the present invention is the provision of a method of producing a welding wire for electric arc welding, which method forms a series of indentations in the wire so that the wire can accept fluxing, filling and/or alloying agents and can have controlled resistance per length of wire.

Another object of the present invention is the provision of a method as defined above, which method can use a standard wire and can be performed at a relatively low cost.

These and other objects and advantages will become apparent from the following description taken together with the accompanying drawings.

BRIEF DESCRIPTION OF DRAWINGS

FIG. 5 is a composite view showing the coordination between current pulses in a pulse arc welding process and the mechanical aspects of the welding process explaining the relationship between the pulses and the quantized segments of a welding wire constructed in accordance with the present invention;

FIG. 6 is a schematic illustration of the welding process showing wire W passing through a contact sleeve as the wire W is melted at arc D by pulses as wire W is moved at a wire feed speed providing a quantized segment Q at the same time as a current pulse; and FIG. 7 is a schematic illustration of the welding process showing the resistance through wire W as a function of the cross-sectional area of wire W.

PREFERRED EMBODIMENT OF THE INVENTION

Figure 1:
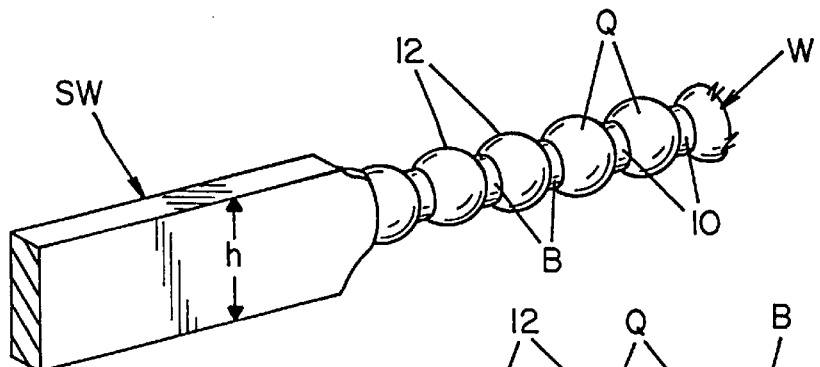
FIG. 1 is a perspective view showing a solid metal welding wire partially constructed in accordance with the present invention.
Figure 2:
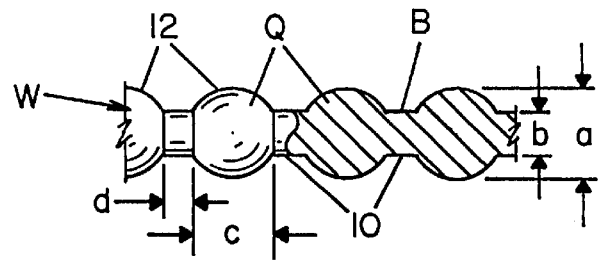
FIG. 2 is a partial cross-sectional area of the wire of FIG. 1.

Referring now to the drawings, wherein the showings are for the purpose of illustrating a preferred embodiment of the present invention and not for the purpose of limiting same, FIGS. 1 and 2 show a welding wire W constructed in accordance with the present invention. Wire W is shown to be formed from a standard rectangular wire SW. Wire SW has a major dimension h which represents the height of the rectangular wire. Wire W has a series of distinct, quantized segments Q separated by connecting or bridging elements B. These bridging elements are formed by a series of axially spaced indentations 10 inward of cylindrical surface 12 for welding wire W. Quantized segments Q can take a variety of shapes from cylindrical to spherical and connecting elements B can have a variety of shapes determined by indentations 10 or other groove like modifications extending inwardly of surface 12. In accordance with the invention, quantized segments Q have a maximum dimension a of wire W. Wire W is formed such that major dimension h of wire SW is substantially greater than maximum dimension a of wire W. As illustrated in FIGS. 1 and 2, quantized segments Q are formed in substantially spherically shaped components that have a maximum diameter of the which determines the cylindrical surface 12 of wire W. Connecting elements B have a diameter b. The cross-sectional area of segments Q is substantially greater than the cross-sectional area of elements B. Thus, the resistance per length of wire W is increased by the indentations 10 forming bridging elements B. The relationship between the length c of segment Q and length d of bridging element B determines the change, or modification, in the resistance per length of wire W over the resistance per length of a standard wire having the diameter a. Thus, indentations 10 have two overall functions. The indentations separate wire W into a series of quantized segments Q each having essentially the same volume of metal. These indentations also increase the resistance through wire W so that the effective resistance per length of wire W is controlled by the contour, size and configuration of indentations 10. Thus, indentations 10 are used to control the effective resistance of wire W, whereas the quantized segments Q provide controlled droplet transfer of molten metal from wire W during the arc welding process. As can be seen, a variety of dimensions can be provided for segments Q and indentations 10 to accurately control the resistance and welding characteristics of solid wire W. However, wire W still functions as a solid welding wire. The quantizing of segments on the solid welding wire and the control of resistance through the wire is unique and forms the advantages of the invention, as previously discussed.

Figure 2A:
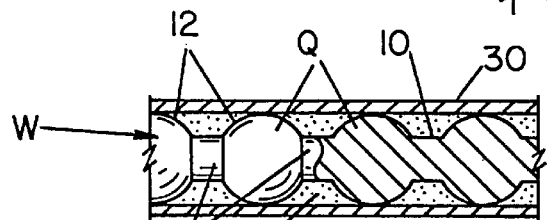
FIG. 2A is the wire in FIG. 2 illustrating an outer metal sheath over the metal welding wire.
Figure 2B:
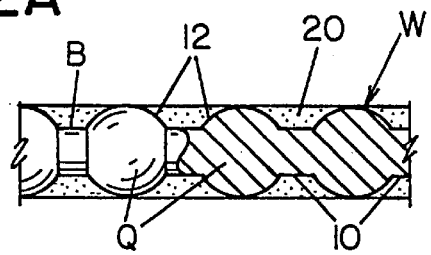
FIG. 2B is the wire in FIG. 2 with the indentations filled with a filling agent, and alloying agent and/or a fluxing agent.

In the preferred embodiment shown in FIGS. 1 and 2, indentations 10 are in the form of generally circular grooves having a diameter b and a length d. By using this, or any similar construction of the indentations, it is possible to load the solid welding wire W with fluxing agents, filling agents, and/or alloying agents. As shown in FIG. 2B, grooves or indentations 10 are filled with a fluxing agent, filling agent and/or alloying agent 20 which is normally granular in nature and formed into a paste. The paste is easily deposited in indentations 10 and remains in indentations 10. Thus, the amount of flux directed to the arc in the welding process is controlled by the size and axial spacing of indentations 10. The wire still has the characteristics of a solid metal wire, which characteristic produces arc stability, while still having the ability of carrying a flux of controlled quantities to the arc during the welding process. In the past, use of flux involved a flux cored welding wire, which wire did not have the beneficial characteristics of a solid wire. There are stick electrodes which have flux agents coated on the outside of the electrodes. Such outside coating could not be used for welding wire of the type to which the present invention is directed. In some instances it may be advisable to cover indentations 10 with an appropriate metal sheath 30, as illustrated in FIG. 2A. This sheath can be a metal sheath as used in flux cored wire. As can be appreciated the sheath can be made of a variety of metals such as a copper sheath to enhance the electrical contact with wire W in the welding equipment. By using sheath 30, indentations 10 are covered so as to retain fluxing agent, filling agent and/or alloying agent 20. The disclosure of FIGS. 1, 2, 2A and 2B show that a variety of structures can be used for either closing indentations 10 and/or loading indentations 10 with several additional constituents, without compromising the solid wire characteristics of wire W or the resistance controlling characteristics obtainable by use of spaced indentations 10. As shown in FIG. 2, electrical contact is maintained with surface 12 and the ratio of diameter a to diameter b and length c to length d can be adjusted to control the ratio of the quantity of materials 20 with respect to the volume of wire W. Sheath 30 prevents moisture and other contaminations from entering indentation 10 and maintains agents 20 in place. In practice, when sheath 30 is employed, it is wrapped around the quantized wire as a metal foil jacket utilizing a spiral wrapping technique. Other methods of applying the sheath include forming the sheath mechanically about the solid wire, plating the sheath on the solid wire, plasma or metal spraying the sheath on the solid wire, etc.

Indentations 10 can have a variety of shapes and can be provided by a variety of procedures. Thus, "indentations" indicate the existence of a reduced volume inward of diameter a, but not necessarily the procedure for accomplishing that decreased size of the volume and the increased resistance in the quantized segments Q. The metal used to form wire W is selected for a particular application. The metal sheath, fluxing agents, filling agents and/or alloying agents, if used, are also selected based upon the particular application.

Figure 3:
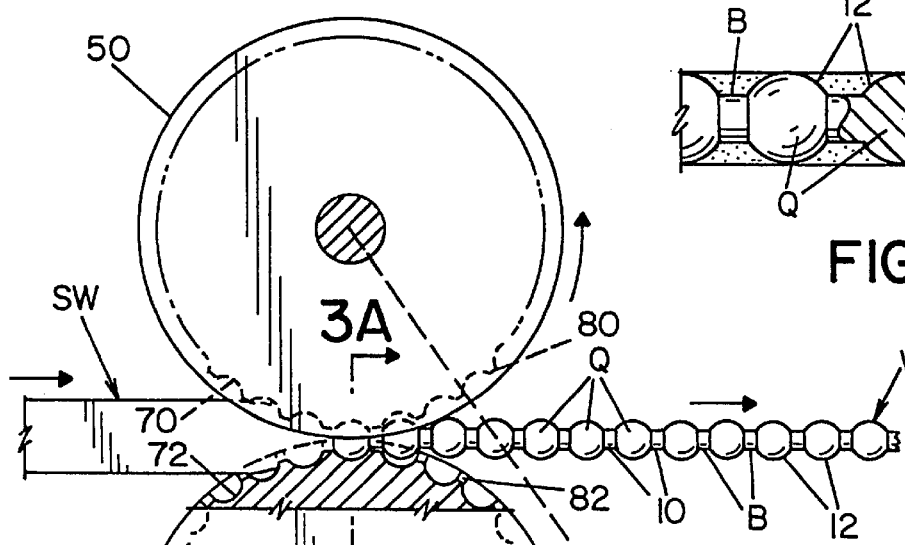
FIG. 3 is a side elevational view schematically illustrating a procedure for forming the spaced quantized segments in the solid metal welding wire during the feeding of the wire by using two rotating forming wheels.
Figure 3:
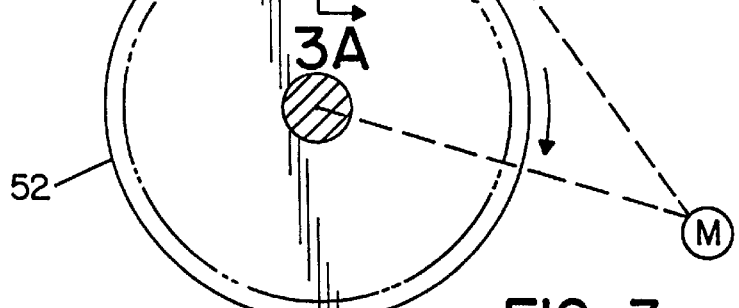
Figure 3A:
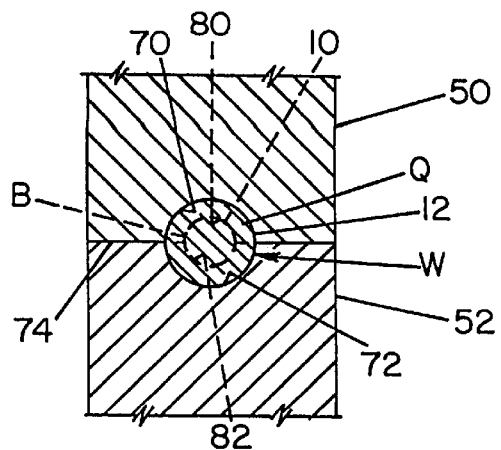
FIG. 3A is an enlarged cross sectional view taken generally along line 3A—3A of FIG. 3 at an indentation forming the bridging element.
Figure 4:
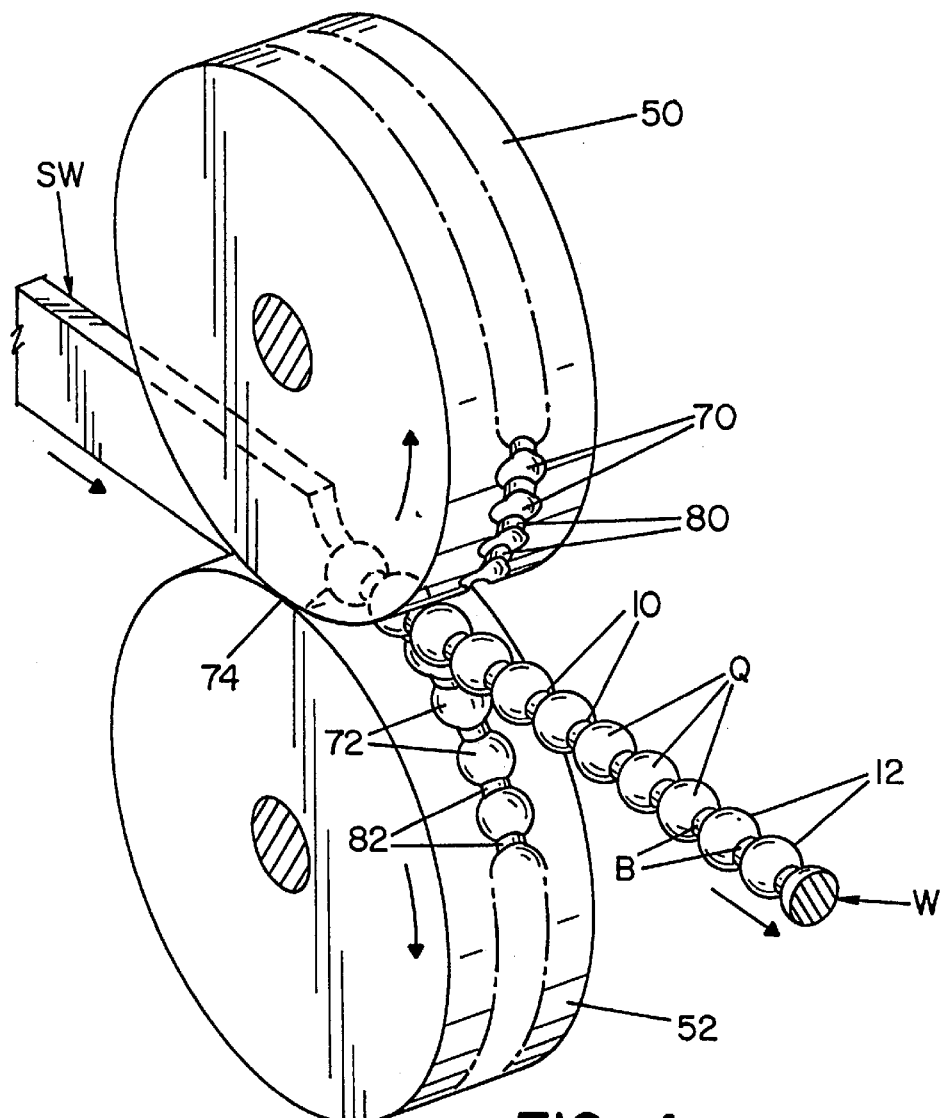
FIG. 4 is a front perspective view schematically illustrating a procedure for forming the spaced quantized segments in the solid metal welding wire during the feeding of the wire by using two rotating forming wheels.

One procedure for accomplishing the indentations 10 is schematically illustrated in FIGS. 3, 3A and 4 wherein forming wheels 50, 52 are located adjacent to the outlet of wire extruder producing wire SW or adjacent to a roll of wire SW. Wheels 50, 52 have a series of circumferentially spaced cavities 70, 72 coming together at joint 74, as shown in FIG. 3A to upset wire SW at axially spaced locations and reform rectangular wire SW into a generally cylindrical wire W having axially spaced indentations 10. Relief areas 80, 82 are provided on wheels 50, 52, respectively for accommodating spaced, quantized segments Q to produce a wire W, as shown in FIG. 2. Forming wheels 50, 52 could be located adjacent the welding operation in front of the wire feeder for driving welding wire W to the welding area. In this manner, an operator could customize the size of segments Q and the configuration of indentations 10 with respect to the actual welding process to be performed. A different set of wheels 50, 52 could be provided for various welding operations. A standard wire SW could be provided to the welding locations and the quantized segments Q would be formed on the wire at that site. This is an advantage of the present invention and allows customized production of a solid welding wire having quantized segments Q separated by bridging elements B. Other arrangements could be provided for creating the indentations 10, such as laser cutters, end mills, saws, etc.

One advantage of a solid welding wire constructed in accordance with the present invention is that it can be coordinated with a pulse welding process, as schematically illustrated in FIG. 5 wherein a series of current pulses 100 from a constant voltage power supply have a time spacing $t_1$ to $t_2$. The pulse frequency of the pulses 100 is a known value, such as X pulses per minute. FIG. 6 illustrates schematically the welding process, wherein wire W is passed through a contact sleeve 110 toward a workpiece 112 so that wire W is melted at arc D by pulses from a power supply connected to negative lead 120 and positive lead 122. As pulses 100 are directed through arc D, wire W is moved at a wire feed speed providing a quantized segment Q at the same time as a current pulse 100. The wire feed speed is coordinated with the frequency of the current pulses so that a quantized amount of metal is provided for each pulse to melt during the pulse welding procedure. Referring to FIG. 7, the relationship between the resistance of the wire along a particular length of the wire as a function of the power P supplied to the wire W is shown. The resistance of a section of wire W is a function of temperature and is represented by $R=R_0+A \times Temp$, wherein R is the resistance of the wire, $R_0$ is the resistance of the wire and ambient temperature, A is a constant, and Temp is the temperature about ambient temperature. As can be appreciated, during the melting of the wire, the resistance in the regions of the indentations 10 increases due to the reduced cross-sectional area of the wire. The power supplied to the wire is illustrated as being dependant on the cross-sectional area of the wire and is represented by $P=I^2/(100 \times Area_{cross})$, wherein P is the power supplied to the wire, I is the current supplied to the wire and $Area_{cross}$ is the cross-sectional area of the wire. As the cross-sectional area of the wire is reduced, the amount of current to the wire can be reduced while maintaining a constant amount of power to the wire.

The special shape of the wire results in a change in the arc and the resultant weld. The special shape of the wire controls the transfer of the molten wire through the arc by forcing individual droplet transfer. Each droplet is generally of a fixed size and separates from the wire at a generally precise frequency. This type of droplet transfer occurs because the indented region of the wire melts first. The indented region has a larger resistance due to its smaller cross-sectional area as compared to the non-indented region. Therefore, the heating of the indented region is accelerated because of the larger resistance and resulting higher temperatures during welding. Pinch forces also assist in the droplet transfer. The pinch force is the electromagnetic pressure than constricts the wire during welding. The smaller cross-sectional area at the indented region produces increased pinch forces, thereby assisting in the detachment of the droplet from the wire and assisting to propel the droplet into the arc. The special shaped wire design results in significant advantages over conventional wire. The special shaped wire welds at higher deposition rates than can be achieved with conventional wire. The special shaped wire requires less energy weld as compared to conventional wire. The reduced energy requirements allows for thinner materials to be welded and the reduction in the amount of distortion of the welded materials. The special shaped wire enhances the STT200 process and MIG welding, and increases the deposition rates when welding open root joints such as on pipes. The heat effected zone of the welded materials is reduced when using the special shaped wire thereby resulting in improved mechanical properties of the weld. The use of the special shaped wire also results in cleaner welds due to the generally precise droplet control that results in reduced spatter. The special shaped wire also generated reduced amounts of fumes and soot since the wire is transferred in the form of a droplet instead of being vaporized in the arc. This ability to coordinate specific quantities of metal for each current pulse is an advantage of the present invention. There are other advantages as previously discussed whereby the novel concept of using quantized segments in a solid metal welding wire to produce controlled resistance and superior droplet transfer.

The invention has been described with reference to preferred embodiments and alternates thereof. It is believed that many modifications and alterations to the embodiments discussed herein will readily suggest themselves to those skilled in the art upon reading and understanding the detailed description of the invention. It is intended to include all such modifications and alterations in so far as they come within the scope of the present invention.

Having thus described the invention, the following is claimed:

1. A welding wire for use in electric arc welding, said wire having an effective outer diameter and comprising a length of solid metal having a first major dimension reshaped into a series of distinct segments, each of said segments having a selected volume and a second major dimension and joined together by interconnecting bridging elements, the cross-sectional area of said solid metal at said segments being greater than the cross sectional area of said solid metal at said bridging elements, said first major dimension being greater than said second major dimension, a plurality of said segments being at least partially spherical, a plurality of said at least partially spherical segments having a maximum outer diameter that is substantially equal to said effective outer diameter of said wire, said connecting bridging elements have a diameter less than said diameter of said distinct segments.

2. A welding wire as defined in claim 1, wherein each of said segments having substantially the same volume of solid metal.

3. A welding wire as defined in claim 1, wherein at least one of said indentation containing a granular flux.

4. A welding wire as defined in claim 1, wherein at least one of said indentation containing an alloying metal powder.

5. A welding wire as defined in claim 3, wherein at least one of said indentation containing an alloying metal powder.

6. A welding wire as defined in claim 1, including an outer metal sheath at least partially encircling said length of said solid metal.

7. A welding wire as defined in claim 3, including an outer metal sheath at least partially encircling said length of said solid metal.

8. A welding wire as defined in claim 4, including an outer metal sheath at least partially encircling said length of said solid metal.

9. A welding wire as defined in claim 5, including an outer metal sheath at least partially encircling said length of said solid metal.

10. A welding wire as defined in claim 1, wherein said connecting bridging elements are generally cylindrical to define circular indentations between said segments.

11. A welding wire as defined in claim 2, wherein at least one of said indentation containing a granular flux.

12. A welding wire as defined in claim 11, wherein at least one of said indentation containing a granular flux.

13. A welding wire as defined in claim 12, wherein at least one of said indentation containing an alloying metal powder.

14. A welding wire as defined in claim 13, including an outer metal sheath at least partially encircling said length of said solid metal.

15. A welding wire as defined in claim 14, wherein said connecting bridging elements are generally cylindrical to define circular indentations between said segments.

16. A welding wire as defined in claim 1, wherein said distinct segments and interconnecting bridging elements have a resistance, said resistance of said distinct segments being less than said resistance of said interconnecting bridging elements.

17. A welding wire as defined in claim 15, wherein said distinct segments and interconnecting bridging elements have a resistance, said resistance of said distinct segments being less than said resistance of said interconnecting bridging elements.

18. A welding wire for use in electric arc welding, said wire having an original outer diameter and comprising a length of solid metal core reshaped into a series of distinct segments and a metal sheath, each of said segments having a selected volume and a maximum diameter and joined together by interconnecting bridging elements with the cross sectional area of said solid metal at said segments being greater than the cross sectional area of said solid metal at said bridging elements, said maximum diameter of said distinct segments being greater than said original outer diameter of said solid metal core, said metal sheath at least partially surrounding said solid metal core, a plurality of said segments being at least partially spherical, a plurality of said at least partially spherical segments having a maximum outer diameter that is substantially equal to an effective inner diameter of said metal sheath, said connecting bridging elements have a diameter less than the diameter of said distinct segments.

19. A welding wire as defined in claim 18, wherein a plurality of said segments having substantially the same volume of solid metal.

20. A welding wire as defined in claim 18, wherein at least one of said bridging elements contains a granular flux.

21. A welding wire as defined in claim 19, wherein at least one of said bridging elements contains a granular flux.

22. A welding wire as defined in claim 18, wherein at least one of said bridging elements contains an alloying metal powder.

23. A welding wire as defined in claim 21, wherein at least one of said bridging elements contains an alloying metal powder.

24. A welding wire as defined in claim 10, wherein a plurality of said bridging elements have a substantially circular cross-sectional shape.

25. A welding wire as defined in claim 23, wherein a plurality of said bridging elements have a substantially circular cross-sectional shape.

26. A welding wire as defined in claim 18, wherein said distinct segments and interconnecting bridging elements have a resistance, said resistance of said distinct segments being less than said resistance of said interconnecting bridging elements.

27. A welding wire as defined in claim 25, wherein said distinct segments and interconnecting bridging elements have a resistance, said resistance of said distinct segments being less than said resistance of said interconnecting bridging elements.

\* \* \* \* \*